United States Patent
Livingood

[15] 3,689,149
[45] Sept. 5, 1972

[54] PHOTOGRAPHIC PRINTING APPARATUS HAVING VARIABLE LENGTH PRINT PAPER

[72] Inventor: James S. Livingood, Reseda, Calif.

[73] Assignee: Drewry Photocolor Corporation, Burbank, Calif.

[22] Filed: Nov. 12, 1970

[21] Appl. No.: 88,680

[52] U.S. Cl. .................. 355/46, 355/54, 355/64, 355/74
[51] Int. Cl. ............................. G03b 27/44
[58] Field of Search .......... 355/46, 54, 55, 64, 74, 53

[56] References Cited

UNITED STATES PATENTS

| | | | |
|---|---|---|---|
| 3,292,485 | 12/1966 | Mey | 355/74 X |
| 3,488,119 | 1/1970 | Dixon et al. | 355/74 |
| 3,283,648 | 11/1966 | Froese | 355/55 X |
| 3,169,441 | 2/1965 | Johnson | 355/54 X |
| 3,212,396 | 10/1965 | Schwardt et al. | 355/46 X |

Primary Examiner—Samuel S. Matthews
Assistant Examiner—Richard A. Wintercorn
Attorney—Fulwider, Patton, Rieber, Lee & Utecht

[57] ABSTRACT

A photographic printing apparatus for printing a series of patterns of prints and including a film carrier for positioning film to have light projected through the frames thereof and along an optical axis for projecting images on printing paper positioned on a printing paper support. First and second lens sets are provided for selective movement into the optical axis for projecting respective first and second patterns of images onto the printing paper, such patterns occupying respective first and second lengths of such paper. Printing paper advance means is connected with the printing paper support and the first and second lens sets and is responsive to the first lens set being moved into such optical axis to advance the printing paper the first length and is responsive to the second lens set being moved into the optical axis to advance the paper such second length whereby the respective first and second patterns of prints may be printed on the printing paper at immediately adjacent locations.

13 Claims, 7 Drawing Figures

PATENTED SEP 5 1972 3,689,149
SHEET 1 OF 3
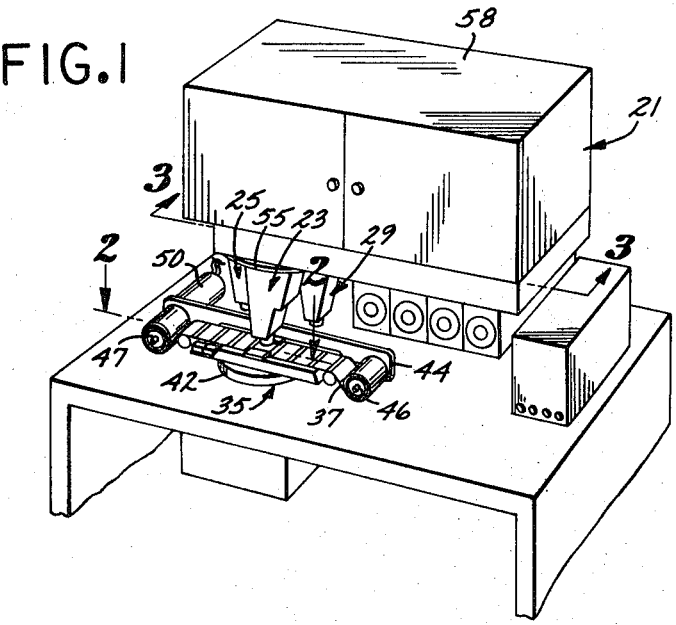
FIG.1
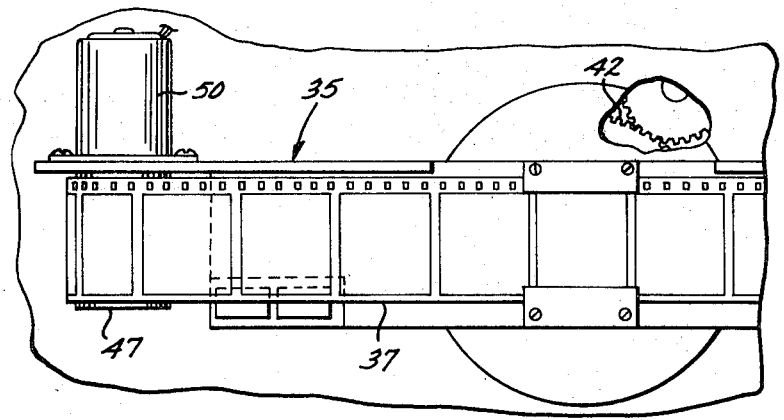
FIG.2
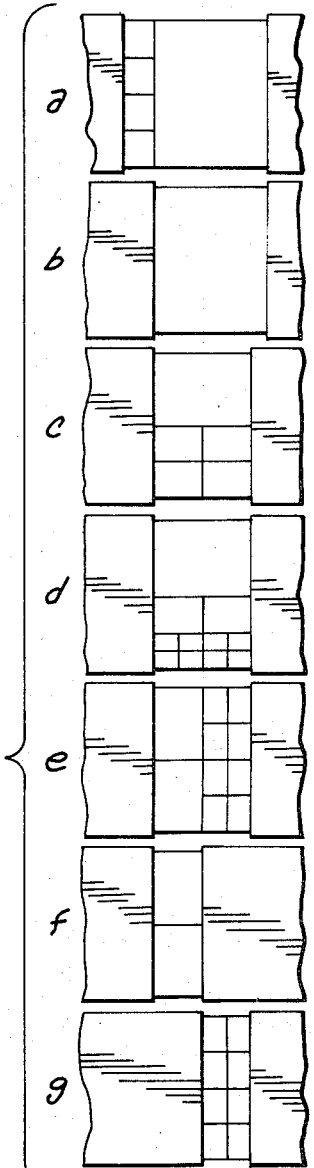
FIG.5 { a, b, c, d, e, f, g
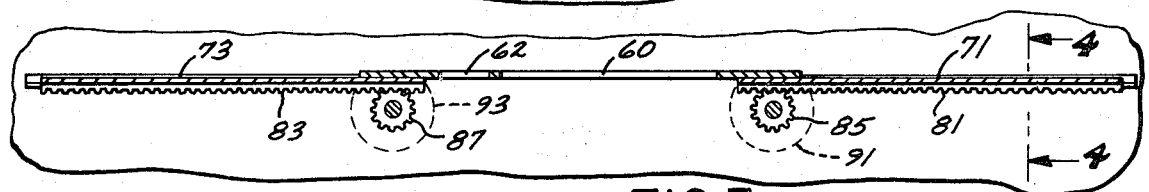
FIG.3
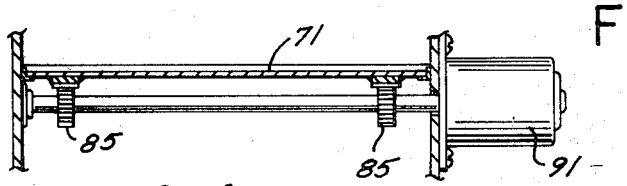
FIG.4
INVENTOR.
JAMES S. LIVINGOOD
BY Fulwider, Patton, Rieker,
Lee and Utecht
ATTORNEYS

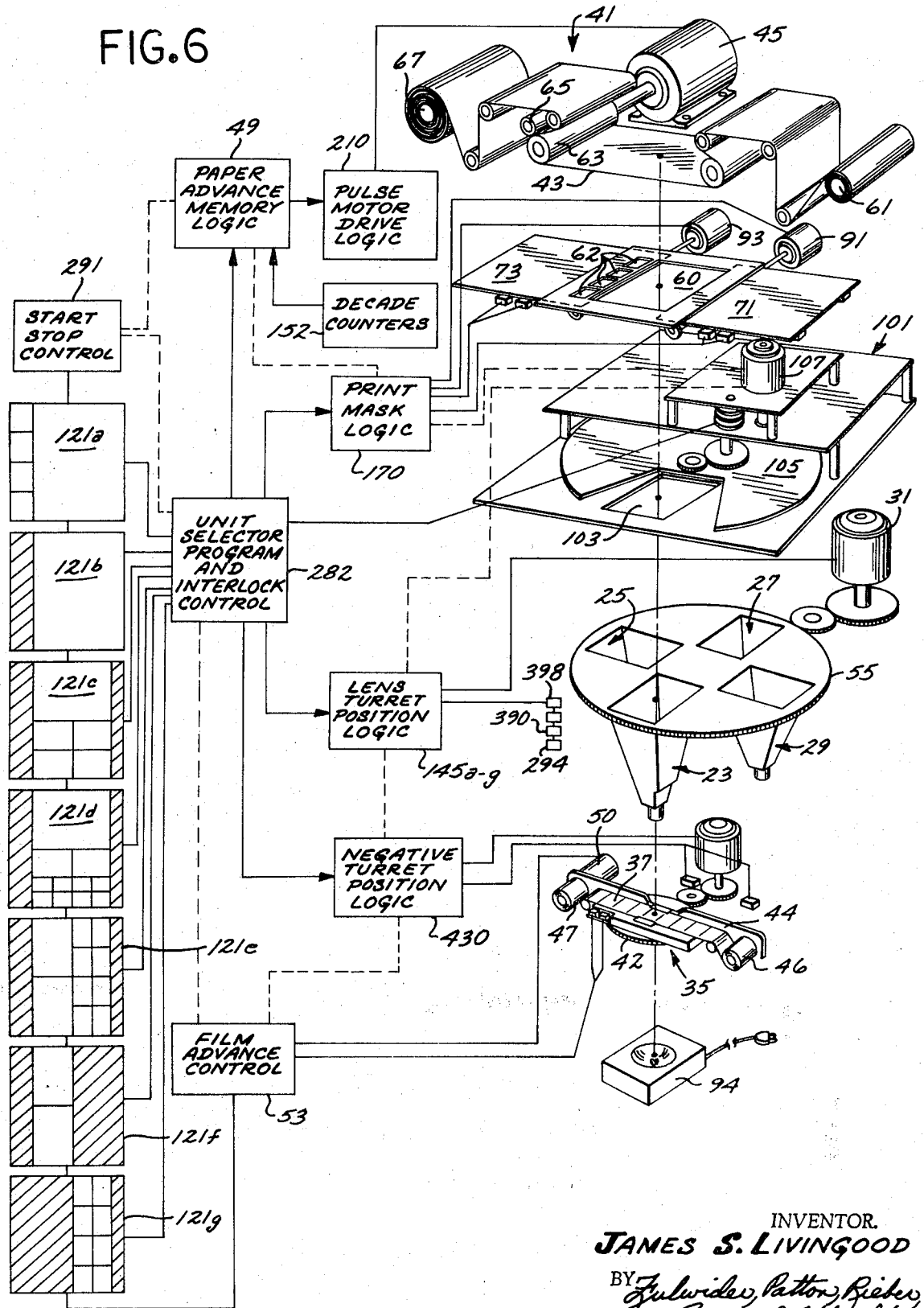

3,689,149

PHOTOGRAPHIC PRINTING APPARATUS HAVING VARIABLE LENGTH PRINT PAPER

BACKGROUND OF THE INVENTION

1. Field of the Invention

The photographic printing apparatus of present invention relates to printing devices for printing a plurality of different sized prints from the same film negative.

2. Description of the Prior Art

In certain areas of commercial photography it is common practice to photograph individuals, such as school pupils, to form negatives on a reel of film. They may then order a certain combination of different sized prints to be printed from the negatives. Since different orders may specify different combinations of prints it is desirable to have a photographic apparatus which can be set to automatically print selected combinations of prints of a plurality of different negatives. Photographic printing devices have been proposed for printing different combinations of prints from the respective negatives as shown in U.S. Pat No. 3,169,441. However, photographic printing devices of this type provide for the printing paper being advanced the same distance between such printing so the number and combinations of prints printed at each exposure must be such that they will fully occupy the entire length of printing paper advanced or excessive trimming will be required thereby consuming large amounts of time and unduly wasting the printing paper. Consequently, both the various combinations and sizes or prints which can be printed by such prior art devices are severely restricted.

SUMMARY OF THE INVENTION

The present invention is characterized by a photographic printing apparatus which includes a printing paper support for positioning a continuous strip of printing paper and which is advanced different distances depending on the particular lengths of printing paper occupied by the pattern of prints just printed and the length of paper to be occupied by the pattern of prints to be printed in the next printing.

An object of the present invention is to provide a photographic printing apparatus of the type described which provides for a wide selection of different sizes and various combinations of prints.

Another object of the present invention is to provide a photographic printing apparatus of the type described which will automatically print a selected selection of prints from one negative and will then advance to the next negative and print a selected combination of prints thereof.

DESCRIPTION OF THE DRAWINGS

FIG. 1 is a perspective view of a photographic printing apparatus embodying the present invention;

FIG. 2 is a horizontal sectional view, in enlarged scale and partially broken away, take along the line 2—2 of FIG. 1;

FIG. 3 is a vertical sectional view taken along the line 3–3 of FIG. 1;

FIG. 4 is a vertical sectional view taken along the line 4—4 of FIG. 3;

FIGS. 5a–9 depict a series of the various combinations of patterns of prints which may be printed by the photographic apparatus shown in FIG. 1;

FIG. 6 is a diagrammatic view of the photographic printing apparatus shown in FIG. 1; and FIG. 7 is a schematic of an electrical system which may be incorporated in the photographic apparatus shown in FIG. 1.

DESCRIPTION OF THE PREFERRED EMBODIMENT

General Description

Figure 7:
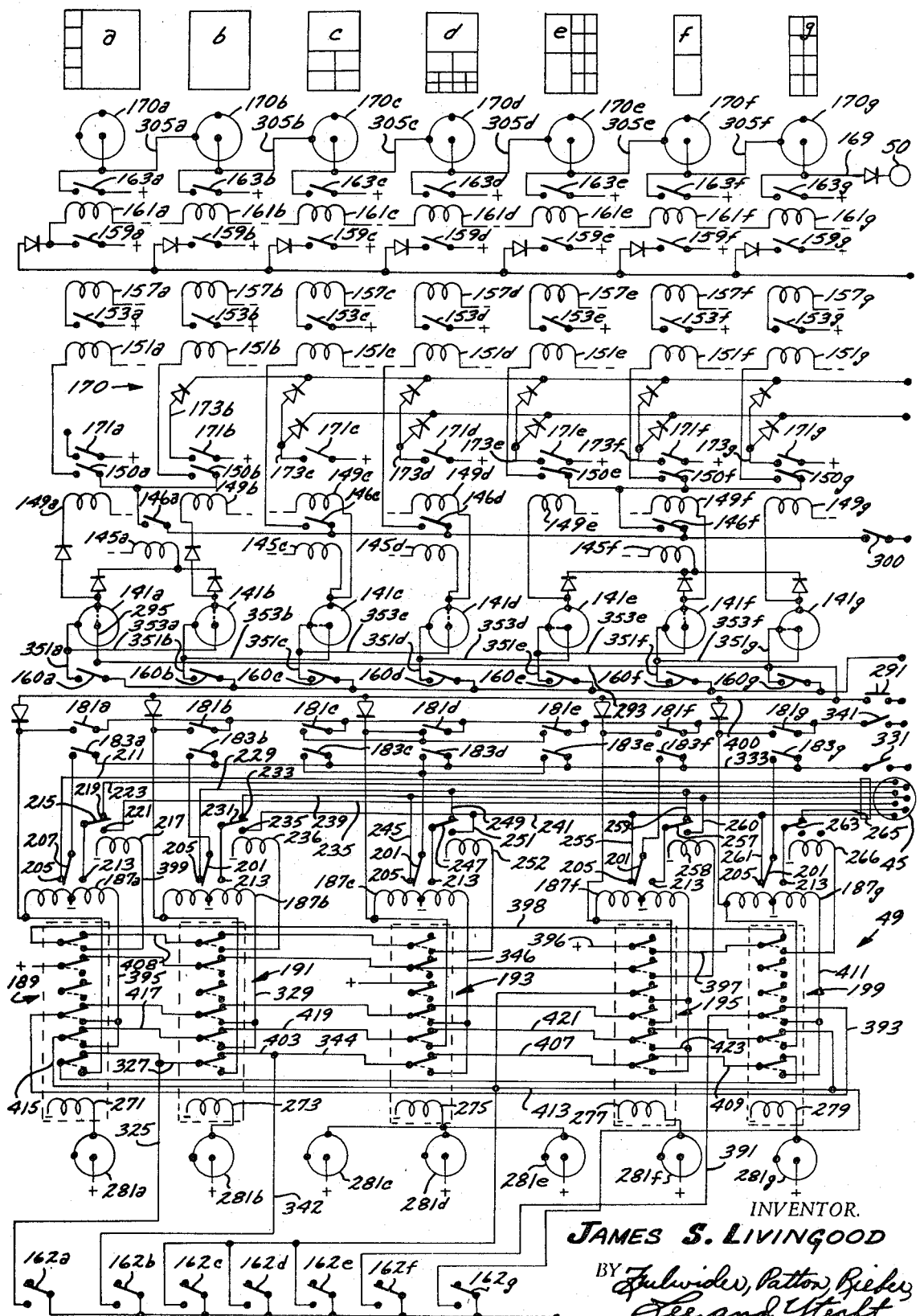

Referring to FIGS. 1 and 6, the photographic printing apparatus of present invention includes, generally, a cabinet 21 which mounts a plurality of lens sets 23, 25, 27 and 29 which are selectively moved into an optical axis 30 by means of a lens turret drive motor 31. Still referring generally to FIG. 6, a film carrier 35 is provided for positioning a film strip 37 for disposition in the optical axis 30 and a printing paper support 41 is provided for positioning printing paper 43 for disposition in such optical axis 30. A printing paper metering motor 45 is provided for controlling advancement of the printing paper 43 and a paper advance selector logic 49 is responsive to the sequence of lens sets 23, 25, 27 and 29 selected for sequential movement into the optical axis 30 to advance different lengths of printing paper 43 depending on the particular disposition of the images to be projected on the printing paper 43 and the particular combinations or subcombinations selected for printing.

FIGS. 5a-g depict the various combinations of prints which may be printed from the lens sets 23, 25, 27 and 29, it being realized that the pattern of prints shown in FIG. 5e, f and g are merely a portion of the prints shown in 5d with the the remainder of such prints having not been printed. The patterns shown in FIGS. 5a-g are arranged crosswise on the paper 43 and are 10, 8, 7, 7, 7, 3½ and 3½ inches in length, respectively.

FILM CARRIER 35

The film carrier 35 is of the type shown in U.S. Pat. No. 3,511,565 and includes a rotary turret 42 formed with a central aperture for passage of light propagated along the optical axis 30. The rotary turret 42 mounts an elongated frame 44 which carries a film feed spool 46 on one end and a film take-up spool 47 on the opposite end. The film take-up spool 47 is driven by a slow speed synchronous motor 50 controlled by a film advance control 53.

LENS TURRET 55

The lens sets 23, 25, 27 and 29 are carried from a lens turret, generally designated 55, and include optics for producing the respective pattern images depicted in FIGS. 5a, 5c, 5d and 5e.

PRINT PAPER ADVANCE 41

With continued reference to FIGS. 1 and 6, the printing paper support 41 is mounted in the enclosed upper portion 58 of the cabinet 21 and includes a feed roll 61 which feeds paper through a series of idler rollers and through the optical axis 30 to a driven control roller 63 carried on the drive shaft of the drive motor 45, such paper being held in frictional engagement with such roller by means of a pressure roller 65. The printed paper 43 is taken up on a take-up roller 67 and both the feed roller 61 and take-up roller 67 are held under constant tension by respective magnetic clutches (not shown) to thereby enable the metering roller 63 to closely control advancement of the paper. The printing paper metering motor 45 is preferably of the type which advances a predetermined distance for each electrical impulse imposed thereon. In the embodiment shown the metering motor 45 advances one full revolution for every 200 electrical impulses imposed thereon the metering roller 63 has a ten inch circumference to thereby provide for an advance of ten inches of printing paper each time the metering motor 45 advances one revolution. Motors of this type are available under the trade name SLO SYN, Model No. SS400–1021.

LIGHT MASKS 71 and 73

The bottom wall of the printing paper compartment 58 (FIG. 1) includes an 8 × 10 inch aperture 60 (FIG. 3) having four smaller apertures 62 disposed along one side thereof. Since the lens sets 23, 25, 27 and 29, for printing the various patterns of prints shown in FIGS. 5a–f must be disposed centrally in the optical axis 30, the shorter patterns of prints will also be disposed with their combined center disposed in the optical axis 30 thereby leaving small lengths of printing paper 43 in front of and behind such patterns which are exposed in light projected through the apertures 60 and 62. In order to selectively block out of this unwanted light we provide a pair of light masks 71 and 73 disposed on the opposite sides of the aperture pattern found by the aperture 60 and 62. Referring to FIG. 3, the masks 71 and 73 include respective gear racks 81 and 83 thereunder which are engaged by respective drive gears 85 and 87 carried on the drive shafts of slow speed synchronous drive motors 91 and 93.

A light source 94 is mounted in the lower portion of the cabinet and is selectively energized to project light upwardly along the light axis 30. Each exposure in the printing apparatus is controlled by means of a shutter device, generally designated 101, and including a bottom wall formed with an aperture 103 disposed in the optical axis 30 and having light therethrough controlled by a rotary shutter 105. The rotary shutter 105 is driven by a shutter drive motor 107.

SELECTOR UNITS 121a–g

Referring to FIGS. 6 and 7, unit selectors 121a, 121b, 121c, 121d, 121e, 121f and 121g are provided for the respective print patterns 5a–g and are generally in the form of rotary switches having a plurality of control contact discs mounted on the shafts thereof. Still referring to FIG. 7, the unit selectors each include respective turret selector discs 141a–g controlling current to respective parallel connected lens turret position relays 145a, c, d and f and respective unit selector relays 149a–g which include respective contacts 150a, b, e, f and g. The units selector relays 149a–g control current to respective stepper count coils 151a–g and/or mash motors 91 and/or 93. The count coils 151a–g control respective electromechanical counters 152 (FIG. 6) that count the number of prints selected for each particular combination and then close respective step, or count-out, contacts 153a–g after the selected number of prints have been printed. The turret position relays 145a, c, d and f control respective relays 146a, c, d and f which control current to the respective count relays 151a, c, d, and f. The selector count-out contacts 153a–g control current to respective relay coils 157a–g which control respective reset contacts 159a–g, transfer contacts 160a–g, and print paper advance logic contacts 162a–g. The counter reset contacts 159a–g are connected in series with respective stepper reset coils 161a–g which reset the electromechanical count unit to '0' position. Relay coil 157a–g also controls contacts 163a–g which provide electrical impulses through stepper discs 170a–g to a lead 160 leading to the film advance control 53.

MASK CONTROL CIRCUIT 170

Also coupled with the unit selector relay coils 149a–g is a mask control circuit, generally designated 170, that includes mask control contacts 171a–g connected with the respective coils 149a–g to control current through respective leads 173b–g connected with selective ones of the mask control motors 91 and 93.

PRINT PAPER ADVANCE LOGIC 49

The unit selector relay coils 149a–g also are coupled with parallel connected printing paper advance reset contacts 181a–g and paper advance pulse contacts 183a–g which control current to the logic circuit 49. The reset switches 181a–g control current to one side of respective coils 187a, b, c, f and g which are also controlled by the logic circuits formed through respective magnetic latch relays, generally designated 189, 191, 193, 195 and 199. Current to the logic circuits set up through the relays 189, 191, 193, 195 and 199 is controlled by the logic contacts 162a–g. The paper advance pulse contacts 183a–g control current to respective selector contacts 201 of the magnetic relays 189, 191, 193, 195 and 199.

One contact 205 of the switch 201 included in the relay 187a is connected with the paper advance motor 45 by means of a lead 211. The other contact 213 of such switch 201 of the relay 187a is connected in series with a selector switch 215 controlled by a relay coil 217 and movable between a first contact 219 and a second contact 221. The contact 219 is connected with the motor 25 by means of a lead 223 for advancing the print paper 43 9 inches when such lead 223 is energized. The other contact 221 is connected with the motor 45 by means of a lead 225 for advancing the print paper 5½ inches.

The selector switch 201 of the relay 187b has its first contact 205 connected with the drive motor 45 by means of a lead 229 for advancing the print paper 43 8 inches. The other contact 213 of such switch is connected with a selector contact 231 which is movable between a first contact 233 and a second contact 235, such selector contact being controlled by a coil 236. The first contact 233 is connected with the drive motor 45 by means of a lead 239 for advancing the paper 43 7 inches. The other contact 235 is connected with the drive motor 45 by means of a lead 241 for advancing the printing paper 43 3½ inches. The first contact 205 of the switch 201 of the relay 187c is connected with the lead 239 by means of a lead 245 and the second contact 213 is connected with a selector contact 247 which has its one contact connected with the lead 229 by means of a lead 249 and its other contact connected with a lead 241 by means of a lead 251, the contact 247 being controlled by a coil 252.

The contact 205 of the switch 201 in the relay 187f is connected with the lead 241 by means of a lead 255 and the other contact 213 is connected with a selector switch 257, controlled by a coil 258, one contact of such switch being connected with the lead 229 by means of a lead 259 and the other contact of such switch being connected with the lead 239 by means of a lead 260.

The first contact 205 of the switch 201 in the relay 187g is connected with the lead 241 by means of a lead 261 and the other contact 213 of such switch is connected through a selector switch 263 to the motor 45 by means of a lead 265 for advancing the printing paper 4 ½ inches. The selector switch is controlled by a coil 266.

Current to the coils 271, 273, 275, 277 and 279 of the respective relays 189, 191, 193, 195 and 199 is controlled by respective ones of selector switch discs 281a–g that are also carried on the selector switch shaft.

Referring to FIG. 6, an interlock circuit 282 similar to that shown in U.S. Pat. No. 3,169,441 is included in this printer of present invention for interrupting the printing process when the printer malfunctions.

OPERATION

In operation the strip of film 37 to be printed is positioned in the film carrier 35 and the operator sets the selector dials for the unit selectors 121a–g for the desired package of prints to be printed. Assuming the packages to be printed include one set of the prints shown in FIG. 5a, two sets of those shown in FIG. 5b, one set of those shown in FIGS. 5d and 5g, the dials for the respective units selectors 121a, 121b, 121d and 121g are set accordingly with the remaining dials remaining at zero. The start switch 291 (FIG. 7) is then depressed to provide a start signal in the lead 293 and through a lead 295 to the turret position disc 141a and also through a lead 296 to the left hand end of the reset relays 187 to switch the contacts to the left. Since the turret position disc 141a is set at one to assume the broken line position, a circuit will be completed therethrough and to the unit selector relay coil 149a and the turret position relay coil 145a connected in parallel therewith.

Energization of the turret position relay closes count pulse contacts 146a and also closes a set of contacts (not shown) to enable the lens turret motor 31 to rotate the lens turret 55 until the lens set 23 is moved into the optical axis 30, at which point a microswitch 294 (FIG. 6) engages a notch in such turret and drops open to discontinue current flow to such motor 31. Concurrently, the counter contacts 150a will be closed to complete a circuit path to the count coil 151a and to close the reset contacts 181a and paper advance pulse contacts 183a.

The shutter 105 rotates continuously unless the interlock circuit 282 is open and when the aperture 103 is opened, the light source 94 is energized to project light along the optical axis 30 through the lens set 23 to project a large image through the large aperture 60 and four small images through the small apertures 62 and onto the print paper 43 to print the pattern of prints shown in FIG. 5a. When such shutter 105 rotates to its open position, it closes a relay 300 (FIG. 7) to provide a count pulse in the pulse lead 301 and through the count pulse contacts 146a and 150a to the stepper count coil 151a for energization thereof. Energization of the stepper count coil 151 steps the associated mechanical counter (not shown) one unit and since only one set of prints shown in FIG. 5a were dialed into the selector unit 121a the stepper count-out contacts 153a are closed thereby energizing the count-out relay coil 157a to effect closure of the stepper reset contacts 159a, turret transfer contacts 160a, and logic contacts 162a.

Closure of stepper reset contacts 159a energizes the stepper reset coil 161a to reset the selector unit 121a back to zero to ready it for the next package selection.

The count-out relay coil 157a also closes the film advance contacts 163a to provide a film advance pulse through the lead 305 to the film advance disc 170b. However, since the unit selector 121b is not set at zero, the circuit through such disc 170b is open to prevent passage of the film advance pulse. The paper advance relay selector discs 281a, b, d and f are all in position to complete circuits therethrough to the respective relay coils 271, 273, 275 and 277 to hold the respective relays 189, 191, 193 and 195 in their energized broken line positions.

Closure of the logic contacts 162a provides current through leads 325, 327, and 329 to the left hand end of the selector coil 187 of relay 187b to switch the selector contact 201 to the contact 205.

When the shutter 105 rotates closed it engages a microswitch 331 disposed adjacent thereto to provide a paper advance pulse in the lead 333, through the paper advance pulse contacts 183b to the selector switch 201 which is in contact with the contact 205 to thereby provide a pulse through the lead 229 to energize the metering motor 45 to rotate such motor sufficiently to advance the print paper 43 8 inches. The motor 45 is of the type that rotates one full revolution in response to 200 electrical pulses, so for this advancement an oscillator 500 (FIG. 6) feeds 160 pulses into such motor. A counter counts advancement of the printing paper 43 and at the end of advancement thereof closes a switch 341 to provide a reset pulse in the lead 343 leading to the reset contacts 181b to provide a current in the left hand side of the reset coil 187b to assure that the selector switch 201 is closed on the contact 205.

Closure of the transfer contacts 160a provides a pulse through leads 351a and 353a to turret position disc 141b. Since the turret position disc 141b has not been set at zero, a circuit is completed therethrough and through a lead 355 to the turret position relay 145a and also to the unit selector relay coil 149b to effect closure of the unit selector contact 150b and mask selector contacts 171b. Closure of the mask contacts 171b provides current through the lead 173b to mask motor 93 to cause such motor to rotate sufficiently to shift the mask 73 inwardly approximately 2 inches to block light passage through the small apertures 62 and permit light passage only through the aperture 60 forming the large image on the print paper 43. When the shutter 105 rotates to its open position to print the prints the count pulse switch 300 is again closed to provide a count pulse in the lead 301 and through the closed contacts 146a and 150b to the stepper count coil 151b to cause the mechanical counter 152 coupled therewith to count the print being printed.

Energization of the unit selector relay 149b also closes reset contacts 181b and paper advance pulse contacts 183b. As the shutter 105 closes the aperture 103 the microswitch 331 will be closed to provide a paper advance pulse in the lead 333 and through the contacts 183b to the selector switch 201 of the selector relay 191 to energize the associated contact 205 to provide current in the lead 229 leading to the metering motor 45 to energize such motor and advance the metering paper 43 8 inches. At the end of the paper advance cycle, the switch 341 will be closed to provide a reset pulse in the lead 343 and through the reset contacts 181 to the left hand side of the relays coil 187 of the selector switch 201 included in the relay 191 to assure that the selector switch 201 is positioned to complete a circuit through the contacts 205 for providing advancement of an 8 inch length of print paper 43 for printing the next print.

When the shutter 105 starts another revolution the aperture 103 will be opened to effect printing of a second large print corresponding with FIG. 6 and such shutter will engage the microswitch 300 to provide a count pulse in the lead 301 and through the contacts 146a and 150b to the stepper count coil 151b. Energization of the stepper count coil 151b will advance the mechanical counter 152 connected therewith and since printing of the selected number of prints has been completed, the stepper count-out contacts 153b will be closed to energize the stepper count-out coil 157b to close the count-out contacts 162b. Closure of the reset contacts 159b will energize the reset coil 161b to reset the mechanical counter at zero and also close the film advance contacts 153b to provide a pulse through the lead 305b to the film advance disc 170c. Since the unit selector 121c is set at zero the circuit will be completed through the film advance disc 170c to the lead 305c leading to the film advance disc 170d. However, since the film advance disc 170d is not set at zero, there is an open circuit therethrough and the film advance circuit is not completed to the film advance motor 50.

Closure of the print paper logic contacts 162b provides current through leads 342, 344 and 346 to the right hand end of the selector coil 187 of the relay 193 to switch the contact 201 to the contact 213. Closure of the transfer contacts 160b provides a transfer pulse in the lead 351b and through the lead 353b to the turret position disc 141c and since the unit selector 121c is set at zero, a circuit is completed through the disc 141c to the lead 353c so such pulse continues on to the turret selector disc 141d which communicates such pulse to the turret position relay 145d and the unit selector relay coil 149d. Closure of the mask position contacts 171d provides current through the lead 173d to the mask drive motors 93 and 91 to move the respective masks 73 and 71 in sufficiently far to block out 2 inches and 1 inch, respectively, on the print paper 43 to form a print pattern area on such paper which is 7 inches long and is centered on the optical axis 30 for receipt of a pattern of images for printing the pattern of prints shown in FIG. 5d.

Energization of the turret positioning relay 149d enables the lens turret 55 to rotate until the lens set 27 is disposed in the optical axis 34 to project the pattern shown in FIG. 5d, at which time a switch 390 (FIG. 6) disposed adjacent the turret 55 is opened to deenergize the turret drive motor 31.

For printing of the prints shown in 5c and 5d the film support is rotated 90° to its normal position by means of a turret control 430 (FIG. 6) to orient the pictures lengthwise on the print paper 43.

Energization of the coil 149d effected closure of the contacts 181a and 183a so when the shutter closes it closes contact 331 to provide a printing paper advance pulse in through such contacts 183d, leads 201, 247, 249 and 229 to the drive motor 45 to energize such motor and advance the print paper 8 inches.

Closure of the logic contacts 162d provides current through a lead 371 and through the relay 195 to a lead 375 leading to the right hand side of the associated selector coil 187 to switch the selector contact 201 of the relay 195 to the contact 213.

Closure of the turret transfer contacts 160d provides current through the leads 351d and 353d to the turret position disc 141e and since such disc is not at zero a circuit is completed therethrough to conduct the current through the lead 353 to the turret position disc 141f to energize the turret position relay 145f and unit selector relay 149f. Energization of the turret position relay 145f energizes the turret drive motor to rotate the lens turret 55 to bring the lens set 29 into the optical axis 130, at which time a control relay 398 (FIG. 6) is opened to deenergize such motor.

Energization of unit selector relay 149f effects closure of the unit selector contacts 150f, mask control contacts 171f, resets contacts 181f, and paper advance pulse contacts 183f. Closure of the mask control contacts 171f provides current to the mask control motors 91 and 93 to maintain the mask 73 moved inwardly 2 inches and to move the mask 71 in an additional 3½ inches to provide an aperture between such masks for projection of a pattern of light to the print paper 43 which is 3½ inches long as required for the pattern of prints shown in FIG. 5a.

Upon closure of the switch 331 by the shutter 105 a paper advance pulse is communicated through contacts 183f, leads 201, 213 and 259 to energize the motor 45 to advance the printing paper 7 inches.

Closure of the microswitch 300 by the shutter 105 provides current in the lead 301 into the contacts 146f and 150f to energize the stepper count coil 151f, to advance the associated mechanical counter 152 and, since only one print is to be printed, such counter effects closure of the stepper count-out contacts 153f to energize the count coil 157f and effect closure of the stepper reset contacts 159f and also the transfer contacts 160f and paper advance logic contacts 162f. Closure of the film advance contacts 163f provides a current in the lead 305f to the film advance disc 170f and, since such disc is set at zero to complete a circuit through such disc, such current will be communicated on through the film advance lead 169 to the film advance motor 50 to rotate such motor sufficiently to advance the film 37 one full frame.

Closing of paper advance logic contacts 162f provides a current pulse through the lead 391 and through the unenergized relay 199 to the lead 393 and back to the first-mentioned relay 189 and, since such relay is energized, to the lead 395 to the right hand end of the coil 187 of such relay to draw the associated contact 201 into engagement with the contact 213.

A circuit is also completed from the lead 396 of the relay 195 through the leads 397, 398, relay 189 and lead 399 to the coil 217 to switch the contact 215 to the contact 221. Also, closure of the transfer contacts 160f provides current in the lead 351f and 353f to the relay position disc 141g and, since such disc is set at zero, through such disc to the lead 351g and back through the lead 293 to the position disc 141a to start the cycle over again for the next package.

Energization of the unit selector coil 149a effects closure of the print paper advance contacts 183a and when the shutter 105 closes the switch 331, paper advance pulse is provided in the lead 333 through contacts 183a to the associated selector contact 201, contact 213, switch contact 215, contact 221, and through the lead 225 to the oscillator 210 to provide for a print paper advance of 5½ inches. From this point on the printing procedure is the same as described hereinabove.

A particularly important feature of the printing apparatus of the present invention is that the selector units 121a–g may be set for any combination of prints and the print cycle will automatically repeat itself. Thus, if it were desirable to print three sets of the pattern of prints shown in FIG. 5a and one set of those shown in FIG. 5g, the selector units 121a and 121g would be set at three and one respectively.

The start button 291 would then be pressed to provide a start pulse in the lead 293 to the turret position disc 141a to energize the relay selector coil 149a to close the unit selector relay contacts 150a to provide a count pulse to the stepper count coil 151a to advance the mechanical counter one unit. This start pulse is also communicated through the lead 400 and reset contacts 181a–g to reset all the switches 201 to the left. Since there is no current to the mask drive motors 91 and 93, the masks 71 and 73 are retracted. The turret position relay 145a is also closed to rotate the lens turret 55 to bring the lens set 23 into the optical axis.

The unit selector relay 149a also closes the reset contacts 181a and the paper advance pulse contacts 183a. The rotary shutter 105 will rotate open to effect printing of the first pattern of prints and as it rotates closed it will close the microswitch 351 to provide a paper advance signal in the lead 333 and through the contacts 183a to the selector switch 201 which is engaged with the contact 205. Such signal will be communicated through the contacts 201 to the lead 211 to energize the paper metering motor 45 to advance the print paper 43 10 inches to provide an entire 10 inch strip disposed in the optical axis 30 for having the images shown in FIG. 5a printed thereon. As the print paper advance is completed, the microswitch 341 is closed to provide a reset signal in the lead 343 and through the contacts 181a to energize the left hand end of the coil 187 to maintain the contact 201 engaged with the contact 205. As the shutter 105 rotates through another rotation the first set of prints shown in FIG. 5a will be printed and when contacts 341 are closed the left hand end of the coil 187a will be energized to switch the contact 201 to the contact 205 and when the switch 331 is closed after the second printing, the consequent paper advance pulse will be routed through the lead 211 to advance the paper 43 10 inches.

On the third printing in the print paper advance logic contacts 162a will be closed to provide a pulse through the lead 325 and since the relays 191, 193 and 195 are deenergized and open, such pulse will be communicated through the leads 327, 403, 344, 407, 409 and 411 to the right hand side of the coil 187 in the relay 199 to switch the contact 201 into engagement with the contact 213. On closure of the shutter 105 after the third printing the contacts 331 will be closed to route a paper advance pulse through the contacts 183g, contact 205 and 213 and leads 263 and 265 to energize the motor 45 and advance the paper 43 4½ inches.

Closure of the count-out relay contacts 160a provides a signal through the leads 351a and 353a to the turret position disc 141b and through such disc to the lead 353b and so on through the remaining discs 141c and d until the disc 141g is reached. Since the disc 141g is set at one the transfer signal is communicated therethrough and into the unit selector relay 149g and to the turret position relay 145f. Energization of the unit selector relay 149g effects closure of the unit selector relay contacts 150g, mask control contacts 171g, paper advance reset contacts 181g and paper advance pulse contacts 183g. Closure of the mask control contacts 171g energizes the mask drive motors 91 and 93 to move the respective masks 71 and 73 in 1 inch and 3 and one-half inches, respectively.

Closure of the paper advance pulse contacts 185g and production of the paper advance pulse by closure of the switch 331 by closing of the shutter 105 provides current through the selector contacts 201 to the contact 213 and through the contacts 263 to the lead 265 to rotate the metering motor 45 to advance the print paper 43 4½ inches. At the completion of the print paper advance the reset contacts 183g are closed to energize the left hand end of the selector switch coil 187 to reset the selector contacts 201 back to the contact 205 to set circuitry in case another printing were to be effected.

Closure of the logic contacts 162g provides current in lead 411 and through leads 413, 415, and 395 to the right end of the selector coil 187 of the relay 189 to switch the associated contact 201 to the contact 213.

Closure of the transfer contacts 160g provides a pulse through the lead 293 to the turret position disc 141a to energize the turret position relay 145a and unit selector relay 149a thereby closing the unit selector contacts 150a, paper reset contacts 181a and paper advance pulse contacts 183a. Consequently, as the shutter 105 closes to close the switch 331 and provides a paper advance pulse in the lead 333, such pulse will be communicated to the selector contact 201 of the relay 189, to the contact 213, and through the contact 215 to the contact 219, and finally through the lead 225 to the metering motor 45 to advance the print paper 9 inches for printing of the next pattern of prints shown in FIG. 5a.

If the printing apparatus of the present invention were set to print the patterns of prints shown in FIGS. 5b and 5f, it will be clear that the relay coils 273 and 277 of the respective relays 191 and 195 would be energized to maintain such relays closed and the remaining relays would be open. Consequently, current would be provided from the lead 396 from the relay 195 through the leads 397, 298, 408 and 410 to the coil 236 to draw the contact 231 into engagement with the contact 235 so that 3½ inches of paper would be advanced between the printing of the prints shown in FIG. 5a and printing of the prints shown in FIG. 5b.

From the foregoing it will be apparent that any combination of patterns of prints shown in FIGS. 5a–f may be printed for any single negative and that the print paper 43 will automatically be advanced the proper amount for printing of the next pattern of prints immediately adjacent the previously printed pattern of prints to thereby avoid expenditure of excessive trimming time and waste of printing paper.

Various modifications and changes may be made with regard to the foregoing detailed description without departing from the spirit of the invention.

I claim:

1. Photographic printing apparatus for printing a series of patterns of prints, said apparatus comprising:
    a cabinet;
    a film carrier on said cabinet for positioning film;
    printing paper support means for positioning a supply of printing paper;
    light means for projecting a beam of light along an optical axis through said film and onto said printing paper;
    first means for selective positioning in said optical axis to project a first pattern of exposure light onto a first area of said printing paper to print a first pattern of prints occupying a first length of said printing paper;
    second means for selective positioning in said optical axis to project a second pattern of light onto a second area of printing paper to print a second pattern of prints occupying a second length of said printing paper;
    printing paper advance means connected with said light means, printing paper support and said first and second means, said advance means being operative to advance said printing paper said first and second lengths of printing paper; and
    control means connected with said advance means and responsive to said first means moving into said optical axis and actuation of said light means to actuate said advance means to automatically advance said printing paper said first length and to said second means being moved into said axis and actuation of said light means to actuate said advance means to advance said printing paper said second length.

2. Photographic printing apparatus as set forth in claim 1 wherein said second paper length is a predetermined distance shorter than said first paper length and wherein:
    said second means includes a first mask mounted from said cabinet on one side of said optical axis for movement a first distance into said optical axis for blocking light projection onto said predetermined distance of said print paper and said apparatus includes:
    mask control means responsive to movement of said second means into said optical axis to move said mask said first distance into said optical axis.

3. Photographic printing apparatus as set forth in claim 1 that includes:
    first and second counter units connected with said light means and said respective first and second means and including respective first and second selector means for selecting different numbers of said first and second patterns of prints; and
    said control means is connected with said counter units and is said printing paper advance and responsive to a selection of a sequence of a pair of said first patterns of prints and to printing of the first of said pair of first patterns to advance said printing paper said first length for printing of the second of said pairs of first patterns and responsive to a selection of a sequence of said first pattern and a second pattern of prints and to printing of said first pattern of said sequence to advance said paper a third length for printing thereon of said second pattern of said sequence.

4. Photographic printing apparatus as set forth in claim 1 wherein:
    said first and second means includes respective first and second lens sets and a movable lens mount mounting said lens sets for selected movement into said optical axis.

5. Photographic printing apparatus as set forth in claim 1 wherein:
    said first means includes lens means for projecting a plurality of images onto said print paper; and
    said second means includes a mask for movement into said optical axis to block projection of certain ones of said images onto said print paper.

6. Photographic printing apparatus as set forth in claim 2 that includes:
    third means for selective positioning in said optical axis to project a third pattern of light onto said print paper for printing a third pattern of pictures on a third length of print paper which is a selected distance shorter than said first length; and
    said control means is responsive to selection of said third means being moved into said optical axis to move said first mask a second distance into said optical axis for blocking light projection onto said selected distance.

7. Photographic printing apparatus as set forth in claim 2 that includes:
    third means for selective positioning in said optical axis to project a third pattern of light onto said print paper for printing a third pattern of pictures on a third length of print paper which is a selected distance shorter than said first length;
    a second mask mounted on the side of said optical axis opposite said one side for movement a second distance into said optical axis for blocking light projection to a length of said printing paper which is sufficient when added to said predetermined distance to equal said selected distance; and
    said mask control means is responsive to movement of said third means into said optical axis to move said first mask said first distance and said second mask said second distance.

8. Photographic printing apparatus as set forth in claim 3 that includes:
    third means for movement into said optical axis to project a third pattern of images onto a fourth length of said printing paper to print a third pattern of prints on said printing paper;
    a third counter unit connected with said light means and said control means and including selector means for selecting different numbers of third patterns of prints; and said control means is connected with said third counter unit and said printing paper advance and is responsive to selection of a sequence of first and third patterns of prints to move a selected length of print paper into said optical axis for printing of said third pattern and to selection of a sequence of second and third patterns of prints to move a different length of print paper into said optical axis.

9. Photographic printing apparatus as set forth in claim 3 wherein:
said control means is responsive to selection of a sequence of two of said second patterns of prints to move said second length of printing paper into said optical axis for printing of the second of said second patterns.

10. Photographic printing apparatus as set forth in claim 3 wherein:
said control means is responsive to selection of a sequence of a second pattern and then a first pattern of prints to move a fourth length of print paper into said optical axis.

11. Photographic printing apparatus as set forth in claim 1 that includes:
third means for selective positioning in said optical axis to project a pattern of images onto a third area of said printing paper to print a third pattern of prints occupying a third length of said print paper;
package selection means for selecting a selected combination of said first, second and third means for consecutive disposition in said optical axis and wherein;
said film carrier includes means for positioning a strip of film including a first and second negative and said apparatus includes;
film advance means for retaining said first film negative in said optical axis while the selected combination of said first, second and third patterns of prints are printed and for then advancing said film strip to dispose said second negative in said optical axis; and
logic means responsive to selection of said first and second pattern of prints and printing of said second pattern of prints for said first negative to advance a selected length of paper to provide a length of unexposed printing paper of said first length in said optical axis for printing of a first pattern of prints from said second negative and responsive to selection of said first and third pattern of prints and printing of said first pattern of prints for said first negative to advance a selected length of paper to provide a length of unexposed print paper of said first length for printing a first pattern of prints from said second negative.

12. Photographic printing apparatus as set forth in claim 11 wherein:
said logic means includes electrical circuitry including switch means responsive to selection of a combination of said first and second patterns of prints and printing of said second pattern of prints to set up a first circuit path to said paper advance means and responsive to selection of a combination of said first and third patterns of prints and printing of said third pattern of prints to set up a second circuit path to said paper advance means.

13. Photographic printing apparatus as set forth in claim 11 wherein:
said logic means includes means responsive to selection of a combination of said first and third patterns of prints and to printing of said third patterns of prints to advance a desired length of paper to provide a length of said printing paper of said first length for printing of said first pattern of prints from said second negative.

* * * * *